(12) United States Patent
Inniss et al.

(10) Patent No.: US 12,051,882 B2
(45) Date of Patent: Jul. 30, 2024

(54) PARALLEL O-BAND AMPLIFIER

(71) Applicant: OFS Fitel, LLC, Norcross, GA (US)

(72) Inventors: Daryl Inniss, Superior, CO (US); Vitaly Mikhailov, Oxford, NJ (US)

( * ) Notice: Subject to any disclaimer, the term of this patent is extended or adjusted under 35 U.S.C. 154(b) by 284 days.

(21) Appl. No.: 17/760,725

(22) PCT Filed: Sep. 18, 2020

(86) PCT No.: PCT/US2020/051623
§ 371 (c)(1),
(2) Date: Mar. 15, 2022

(87) PCT Pub. No.: WO2021/055844
PCT Pub. Date: Mar. 25, 2021

(65) Prior Publication Data
US 2022/0337018 A1    Oct. 20, 2022

(51) Int. Cl.
| | | |
|---|---|---|
| H04B 10/29 | (2013.01) |
| H01S 3/067 | (2006.01) |
| H01S 3/094 | (2006.01) |
| H01S 3/0941 | (2006.01) |
| H01S 3/23 | (2006.01) |
| H04B 10/291 | (2013.01) |
| H04B 10/294 | (2013.01) |
| H01S 3/091 | (2006.01) |

(52) U.S. Cl.
CPC ...... *H01S 3/06762* (2013.01); *H01S 3/06737* (2013.01); *H01S 3/094007* (2013.01); *H01S 3/094049* (2013.01); *H01S 3/094061* (2013.01); *H01S 3/09415* (2013.01); *H01S 3/2383* (2013.01); *H04B 10/2912* (2013.01); *H04B 10/294* (2013.01); *H01S 3/0912* (2013.01)

(58) Field of Classification Search
CPC ............ H01S 3/06762; H01S 3/06737; H01S 3/094007; H01S 3/094049; H01S 3/094061; H01S 3/09415; H01S 3/2383; H01S 3/0912; H04B 10/2912; H04B 10/294
See application file for complete search history.

(56) References Cited

U.S. PATENT DOCUMENTS

| | | | | |
|---|---|---|---|---|
| 6,212,310 B1* | 4/2001 | Waarts | ................ | H04B 10/291 385/127 |
| 6,665,320 B1* | 12/2003 | Arbore | ................ | H01S 5/4062 372/6 |
| 7,382,810 B2* | 6/2008 | He | .......................... | H01S 3/083 372/102 |
| 2002/0024722 A1* | 2/2002 | Tsuzaki | ................ | H01S 3/302 359/334 |
| 2002/0105715 A1* | 8/2002 | Naito | ...................... | H01S 3/302 359/341.33 |

(Continued)

*Primary Examiner* — Tanya T Motsinger
(74) *Attorney, Agent, or Firm* — Sam Han, Esq.

(57) ABSTRACT

A system (e.g., an optical amplifier) comprising gain fibers (e.g., Bismuth-doped optical fiber) for amplifying optical signals. The optical signals have an operating center wavelength ($\lambda 0$) that is centered between approximately 1260 nanometers (~1260 nm) and ~1360 nm (which is in the O-Band). The gain fibers are optically coupled to pump sources, with the number of pump sources being less than or equal to the number of gain fibers. The pump sources are (optionally) shared among the gain fibers, thereby providing more efficient use of resources.

15 Claims, 6 Drawing Sheets

(56) References Cited

U.S. PATENT DOCUMENTS

| | | | |
|---|---|---|---|
| 2003/0053192 A1* | 3/2003 | Islam | H01S 3/302 359/327 |
| 2006/0023298 A1* | 2/2006 | Ohshima | H01S 3/06754 359/349 |
| 2015/0138630 A1* | 5/2015 | Honea | H01S 3/042 359/341.3 |
| 2015/0295382 A1* | 10/2015 | DiGiovanni | G02B 6/036 385/128 |
| 2016/0315729 A1* | 10/2016 | Tsuzuki | H04J 14/0212 |
| 2018/0083413 A1* | 3/2018 | Rapp | H01S 3/30 |
| 2022/0021173 A1* | 1/2022 | Tench | H01S 3/06754 |
| 2022/0052502 A1* | 2/2022 | Luo | H01S 3/06708 |
| 2022/0115830 A1* | 4/2022 | Yanagimachi | H04B 10/2939 |
| 2022/0337018 A1* | 10/2022 | Inniss | H04B 10/294 |
| 2022/0376811 A1* | 11/2022 | Matsumoto | H04J 14/0209 |
| 2023/0059478 A1* | 2/2023 | DiGiovanni | H01S 3/2316 |
| 2024/0022038 A1* | 1/2024 | Byrne | H01S 3/06758 |

\* cited by examiner

PARALLEL O-BAND AMPLIFIER

CROSS REFERENCE TO RELATED APPLICATIONS

This application claims the benefit of U.S. provisional patent application Ser. No. 62/902,634, filed 2019 Sep. 19, having the title "Parallel O-Band Amplifier," by Inniss, which is incorporated herein by reference in its entirety. This application also incorporates by reference in its entirety (as if set forth expressly) International Application (PCT) serial number PCT/US19/51024, filed on 2019 Sep. 13, having the title "Bismuth Doped Fiber Amplifier," by Applicant OFS Fitel, LLC, and naming as inventors Luo and Mikhailov.

BACKGROUND

Field of the Disclosure

The present disclosure relates generally to fiber optics and, more particularly, to optical communication in the Original Band (O-Band).

Description of Related Art

Optical networks using Original Band (O-Band) are typically single wavelength, point-to-point networks that often span distances of between approximately five hundred meters (~500 m) and approximately ten kilometers (~10 km). However, it is becoming increasingly impractical for conventional O-Band networks to support increasing demands for data.

SUMMARY

The present disclosure provides systems and methods for parallel Original Band (O-Band) optical amplification. As such, one embodiment is a system (e.g., an optical amplifier) comprising gain fibers (e.g., Bismuth-doped optical fiber) for amplifying optical signals. The optical signals have an operating center wavelength ($\lambda 0$) that is centered between approximately 1260 nanometers (~1260 nm) and ~1360 nm (which is in the O-Band). The gain fibers are optically coupled to pump sources, with the number of pump sources being less than or equal to the number of gain fibers. Thus, for some embodiments, the pump sources are shared among the gain fibers, thereby providing more efficient use of resources.

With this in mind, other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Due to cost considerations, point-to-point single-wavelength Original Band (o-Band) communications are often implemented in shorter distances (e.g., less than approximately ten kilometers (~10 km)) for data rates up to approximately ten gigabits per second (~10 Gb/s). Point-to-point O-Band communication is also often implemented at ~100 Gb/s, ~200 Gb/s, and ~400 Gb/s with four (4) or eight (8) wavelengths oftentimes being used in local area network wavelength division multiplexing (LAN-WDM) or coarse wavelength division multiplexing (CWDM) channel plans. Optical transmissions at higher data rates (e.g., greater than or equal to 400 Gb/s) and those for distances over 10 km are also considered but laser output power and receiver sensitivity are typically insufficient for such communications using traditional O-Band systems. Consequently, optical power limits the use of these O-Band systems for high-capacity (e.g., greater than 400 Gb/s) data transmission, or for longer-distance (e.g., more than 10 km) communications, or for both.

Furthermore, even for shorter distances, high-capacity switching (e.g., greater than fifty terabits-per-second (50 Tb/s) throughput) is required to accommodate large amounts of data carried on a large number of data channels (e.g., 128 data channels, each carrying approximately ~400 Gb/s). To accommodate such high-capacity switching, the communications architecture typically requires an increased optical power budget to accommodate a reduced receiver sensitivity that results from the increase in bit-rate. Also, Conventional Band (C-Band) approaches become impractical due to cost and power issues.

Addressing these limitations, this disclosure teaches using the O-Band for high data capacity optical communication (e.g., Coarse Wavelength Division Multiplexing (CWDM) or Local Area Network (LAN) WDM) over increased transmission distances (e.g., distances that exceed ~10 km). Because of excess signal loss, implementation of such CWDM/LAN-WDM-based O-Band communication requires the boosting of signals at either the transmission end or the receiver end (or both) to increase transmission distance. In other words, in the case of multiple parallel O-Band transmission channels, each of those parallel channels must be amplified appropriately to allow for proper signal transmission.

To allow for efficient amplification of multiple O-Band transmission channels, the present disclosure teaches a parallel O-Band amplifier system with: (a) large numbers of parallel gain fibers; (b) maximization of shared components (such as shared pumping of the gain fibers); and (c) minimization of functionality doubling. By maximizing shared components and minimizing functionality doubling, the disclosed O-Band systems reduce cost, complexity, and power consumption, thereby allowing for simpler designs with fewer complex components (such as gain or power control circuits, optical isolators, gain fiber temperature controllers, or gain equalization modules).

By way of example, one embodiment comprises a parallel O-Band amplifier system (having an operating center wavelength ($\lambda 0$) that is centered between approximately 1260 nanometers (~1260 nm) and ~1360 nm). The parallel O-Band amplifier system comprises N gain fibers and P pump sources, with N being an integer that is greater than or equal to two (i.e., N≥2) and P being an integer that is less than or equal to N (i.e., P≤N). Thus, there are fewer pump sources than there are gain fibers, thereby requiring the pump sources to provide shared pump signals to the gain fibers. Also, the system comprises N optical signal outputs, which output amplified optical signals. Those having skill in the art will appreciate that the N optical signals can include four (4), eight (8) wavelengths, thereby allowing for increased data capacity in the N signals using, for example, WDM or other similar methods.

This sharing of pump sources to provide parallel amplification in the O-Band reduces both the cost and power consumption, while concurrently simplifying the design. Furthermore, although placing the parallel O-Band amplifier system where power is low is contrary to conventional wisdom because the accepted wisdom is to increase power levels in order to avoid signal-to-noise (SNR) degradation, the disclosed parallel O-Band amplifier system is placeable at the point in the system where power is low (e.g. before the electrical receiver), thereby reducing power consumption. Also, when configured within a switch based on a silicon photonics chip, the parallel O-Band amplifier system allows for pump redundancy without significant cost to pump power. Additionally, implementation using a silicon photonics chip permits faster, cheaper, and easier replacement of components (e.g., transmission laser, pump laser, etc.) in the event of a failure. Consequently, a previously impractical approach (namely, high data capacity and long-distance O-Band communication with amplification) becomes commercially viable by using the disclosed parallel O-Band amplifier system.

Figure 1:
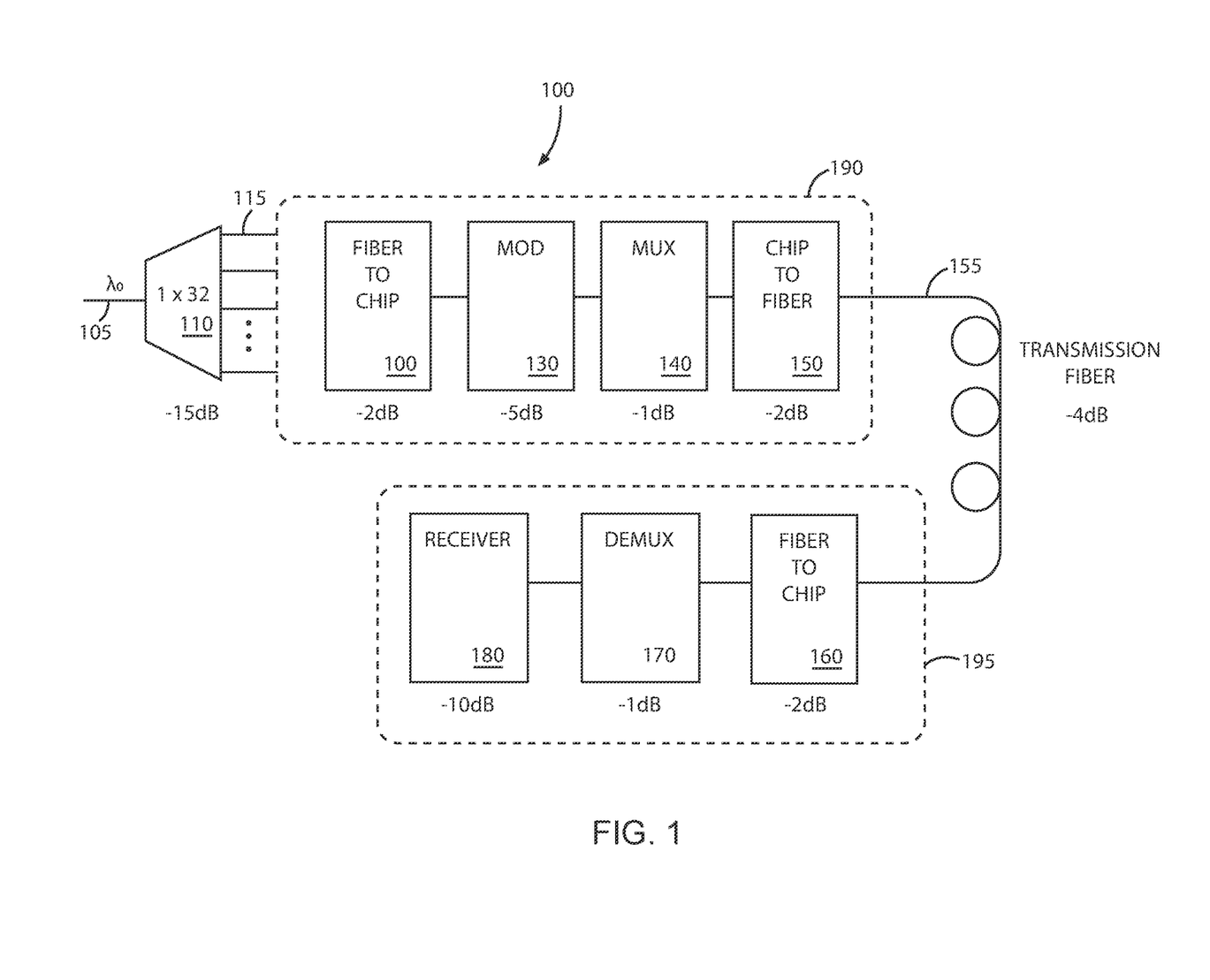
FIG. 1 is a block diagram showing components of an optical transmission system with corresponding signal loss (indicated in decibels (dB)).
Figure 2:
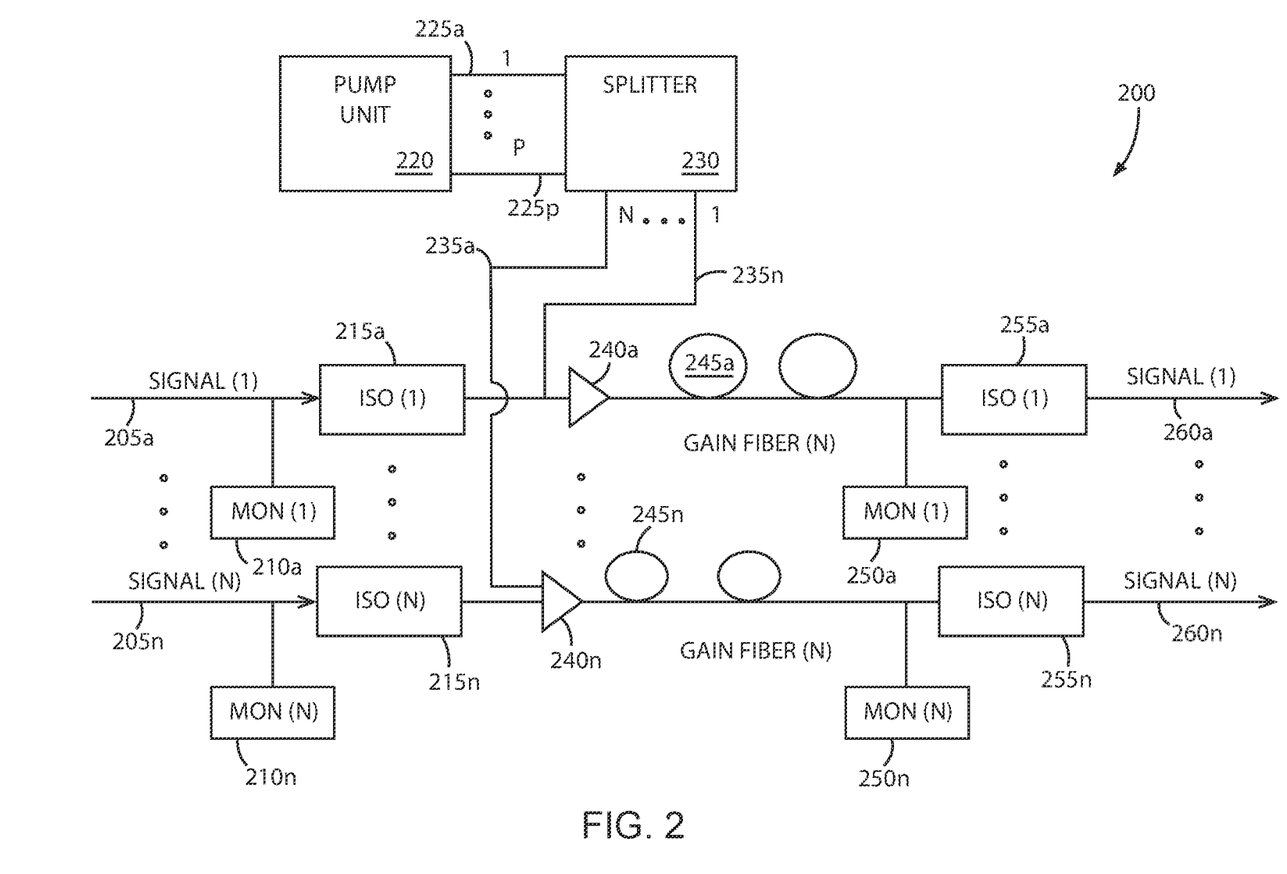
FIG. 2 is a block diagram showing one embodiment of a parallel Original Band (O-Band) optical amplifier system.
Figure 3A:
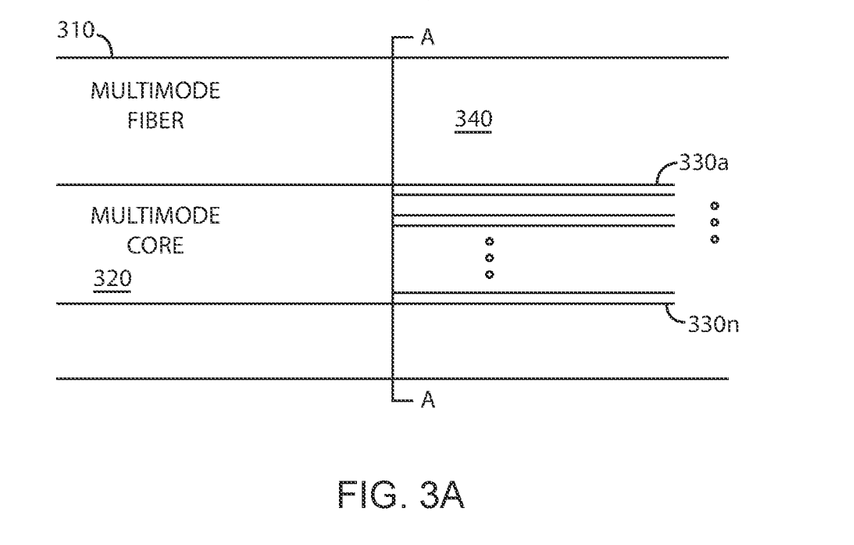
FIG. 3A is a block diagram showing a transverse view of one embodiment of a photonic lantern that converts multi-mode (MM) signals to single-mode (SM) signals.
Figure 3B:
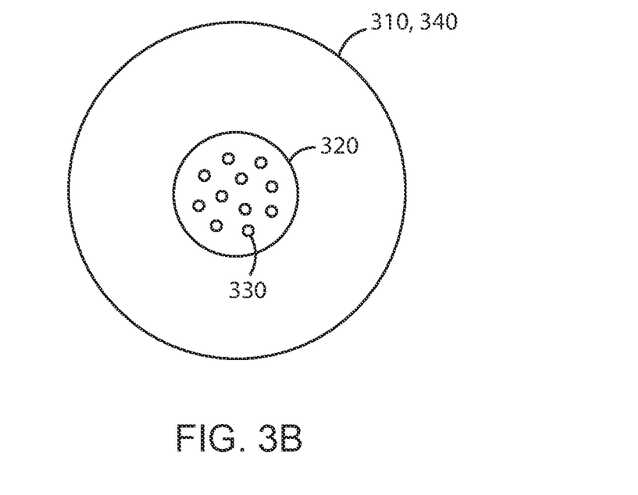
FIG. 3B is a block diagram showing an axial view of the photonic lantern of FIG. 3A.
Figure 4:
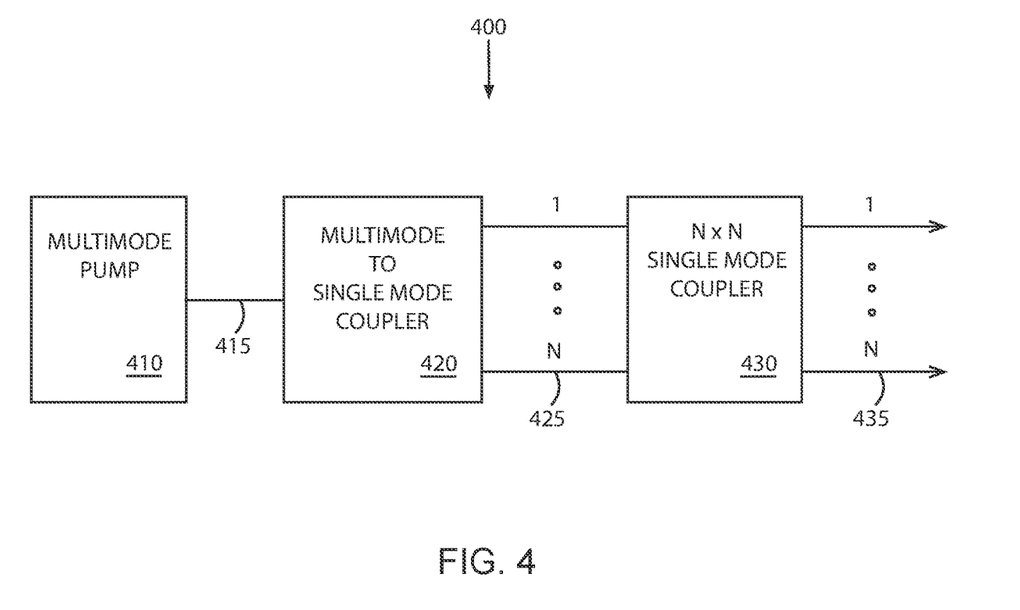
FIG. 4 is a block diagram showing one embodiment of a power equalizer.
Figure 5:
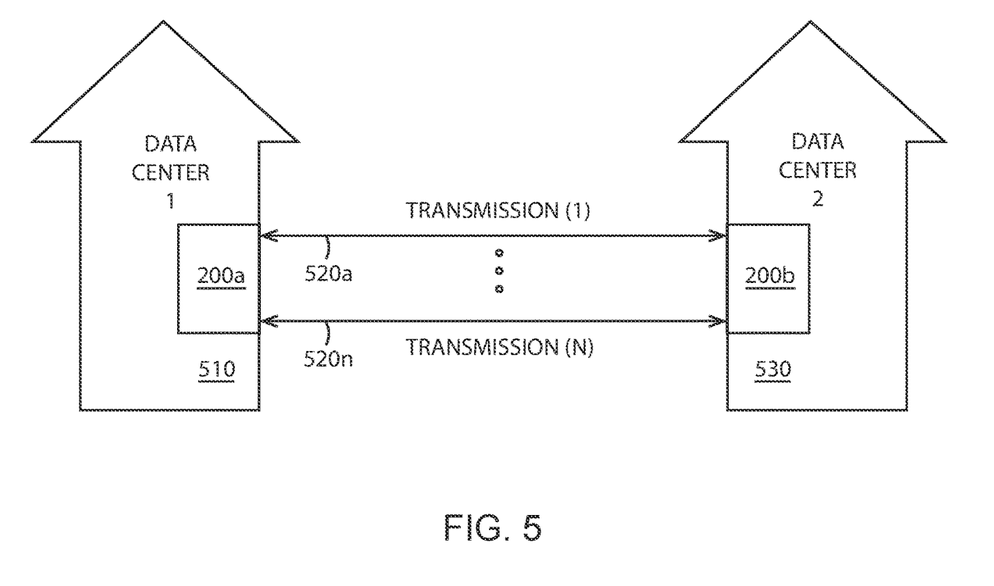
FIG. 5 is a block diagram showing one embodiment of an optical transmission system for optically coupling one data center to another data center through longer-distance transmission fibers.
Figure 6:
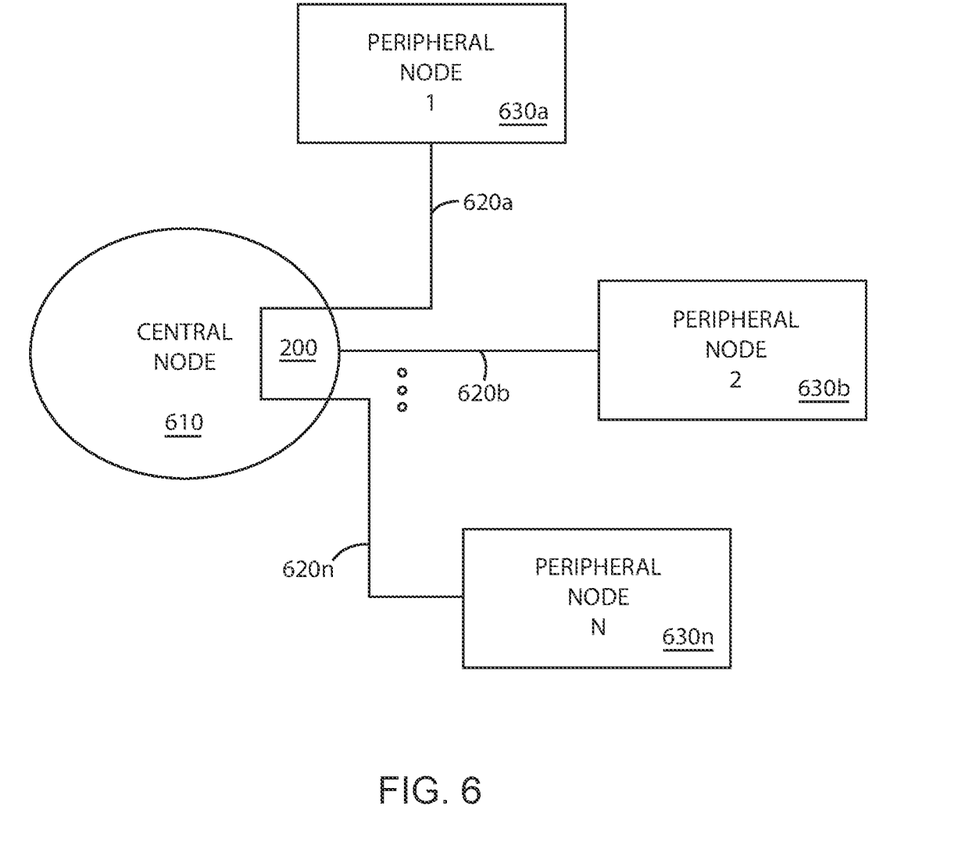
FIG. 6 is a block diagram showing one embodiment of an optical transmission system for optically coupling a central node to multiple peripheral nodes through longer-distance transmission fibers.

Having provided a broad technical solution to a technical problem, reference is now made in detail to the description of the embodiments as illustrated in the drawings. Specifically, FIG. 1 shows one embodiment of a transmission architecture that employs parallel O-Band communications, FIG. 2 shows one embodiment of a parallel O-Band amplifier system, FIGS. 3A through 4 show additional embodiments of system-level components, and FIGS. 5 and 6 show embodiments of networks or environments that apply the parallel O-Band amplifier of FIG. 2. Although several embodiments are described in connection with these drawings, there is no intent to limit the disclosure to the embodiment or embodiments disclosed herein. On the contrary, the intent is to cover all alternatives, modifications, and equivalents.

Turning now to FIG. 1, a communication architecture 100 that uses parallel O-Band optical transmission system is shown with corresponding values for signal loss (noted in decibels (dB)). The parallel O-Band architecture 100 comprises a signal input 105 to a splitter 110 (e.g., 1×32 splitter), which causes a −15 dB loss. The splitter 110 splits the signal, which is input to a semiconductor optical chip 190 on the transmitter end. The optical chip 190 (also designated as a chiplet) comprises a fiber-to-chip module 120, a modulator 130, a multiplexer 140, and a chip-to-fiber module 150. As the optical signal propagates through the optical chip 190, the fiber-to-chip module 120 contributes an additional loss of −2 dB, the modulator 130 increases the loss by another −5 dB, the multiplexer 140 contributes another −1 dB loss, and the chip-to-fiber module 150 loses an additional −2 dB. Thus, even before reaching a transmission fiber 155, the input signal experiences a loss of at least −25 dB.

Continuing, if the optical transmission fiber 155 is approximately ten kilometers (~10 km) in length, then the optical transmission fiber 155 causes an additional loss of −4 dB before the optical signal enters a semiconductor optical chip 195 on the receiving location. The receiving optical chip 195 comprises a fiber-to-chip module 160, a demultiplexer 170, and a receiver 180, each causing additional losses of −2 dB, −1 dB, and −10 dB, respectively. Thus, from the splitter 115 (start) to the receiver 180 (end), the signal experiences a total loss that exceeds −30 dB.

To mitigate for the nearly −30 dB signal loss, a parallel O-Band amplifier system 200 is shown in FIG. 2. As shown in FIG. 2, the system 200 comprises optical signal inputs 205a . . . 205n (collectively designated as 205). Each of the optical signal inputs 205 is capable of carrying signals at multiple wavelengths (e.g., four (4) wavelengths, eight (8) wavelengths, etc.) using, for example, known CWDM or LAN-WDM schemes, thereby allowing for higher data throughput.

Continuing, the system 200 comprises optional input monitors 210a . . . 210n (collectively, 210) for monitoring corresponding optical inputs 205, along with optional input optical isolators 215a . . . 215n (collectively, 215), with the input optical isolators 215 being optically coupled to their respective inputs 205. Depending on the particular network requirements, the input monitors 210 and optical isolators 215 can be omitted for further reductions in cost and complexity.

The system 200 further comprises N gain fibers 245a . . . 245n (collectively, 245), with N being an integer that is greater than or equal to two (i.e., N≥2). Preferably, to achieve greater efficiencies of scale, N≥32 and as high as N≥96 or even as high as N≥128. For practical purposes, it is desirable (but not necessary) to have N be an integer multiple of 8. The N gain fibers 245 are optically coupled to corresponding inputs 205. The gain fibers 245 receive fiber-optic transmission signals from their respective inputs 205 and amplify the transmission signals. It should be appreciated that, for some embodiments, the gain fibers 245 are multi-core fibers. For other embodiments, the gain fibers 245 can be individual gain fibers 245 that are ribbonized.

For some embodiments, the gain fiber 245 is a dispersion compensation gain fiber or a dispersion-flattening gain fiber, which can be manufactured using appropriate co-dopants or varying fiber geometries, as will be appreciated by those having skill in the art. By compensating for chromatic dispersion, the gain fibers can accommodate higher baud rates (e.g., greater than fifty gigabauds-per-second (50 Gbaud/s)) and complex modulation formats (e.g., pulse-amplitude-modulation-4 (PAM-4), PAM-8, etc.).

To pump the gain fibers 245, the system further comprises a pump unit 220 that serves as the source of P pump signals 225a . . . 225p (collectively, 225). Importantly, there are fewer pumps 225 than there are gain fibers 245 (i.e., P≤N), thereby requiring the pump sources to provide shared pump signals to the gain fibers 245. In other words, there are a fewer number of pump sources than there are transmission signal sources, thereby requiring a single pump source 225 to be shared by a subset of gain fibers 245. To achieve desirable efficiencies of scale, in one preferred embodiment, the ratio between N and P is greater than or equal to ten (i.e., N≥10P) and, even more preferably, greater than or equal to sixteen (i.e., N≥16P). Thus, for example, N=96 transmission optical channels can be effectively pumped with six (6) or fewer pumps (i.e., P≤6).

Those having skill in the art will appreciate that the number of optical transmission channels can be as high as (or greater than) 128 (i.e., N≥128), while the number of pump sources P can be as low as (or smaller than) 2 (i.e., P≤2). What should be considered is the balance between the number of components and the performance gain from those components. For example, four (4) 100 milliwatt (mW) lasers that do not require any type of active cooling may be cheaper than a single 400 mW laser that requires active cooling. Furthermore, the use of multiple lasers operating at a linear part of the power-current curve (PI curve) may produce higher efficiencies and lower power consumption than a single laser that operates at close to the saturation point of the PI curve. These, and other considerations, are known to those having skill in the art and, therefore, are not discussed further herein.

It should be noted that, if the gain fibers 245 are multi-core fibers, then the gain fibers 245 can be configured for either core-pumping or for cladding-pumping. Ultimately, the use of shared pump signals 225 permit massively parallel amplification in the parallel O-Band amplifier system 200.

Continuing with FIG. 2, for some embodiments, the pump unit 220 comprises a pump distributor that produces the P pump signals 225, along with the necessary driving circuits. For gain fibers 245 that are Bismuth doped, the pump center wavelength (Op) for the laser diodes is between ~1190 nm and ~1240 nm.

To allow for efficient pump production, some embodiments of the pump unit 220 have laser diodes that are connected in parallel to a current source, thereby allowing for production of the P pump signals 225 from a single current source. Instead of a single current source, it is possible to use multiple current sources. The salient point is that the current sources are shared resources (meaning, the system 200 does not require N current sources), thereby reducing cost and complexity. It should be appreciated that the laser diodes can be either single laser diodes or multiple laser diodes, either cooled or uncooled. Also, the laser diodes may operate as either single-mode or multi-mode.

To distribute pump power evenly, the system 200 further comprises a pump equalizer that substantially equalizes the P pump signals 225. Those having skill in the art will appreciate that the pump unit 220 can comprise a ribbonized output for the P pump signals 225. The embodiment of FIG. 2 also shows a splitter 230 (or a pump distributor), which receives the P pump signals 225 and splits them into N individual pump signals along N parallel paths 235*a* . . . 235*n* (collectively, 235). It should be appreciated that the splitter 230 can also be configured to serve as a pump equalizer, thereby evenly providing ~P/N power across the N lanes (or channels) without reducing the amplification in each lane (or channel). Thus, even for cases when P=N, the use of an N×N splitter would improve reliability.

Alternatively, a number of pumps operating at different wavelengths can be combined by a wavelength-selective combiner (e.g., WDM combiner). In such a case, in addition to power distribution, each lane receives multiple pump wavelengths that may be used to extend or equalize gain bandwidth in O-Band gain fibers (e.g., Bismuth-doped gain fibers).

The N parallel paths 235 are inputs for N corresponding pump-signal combiners 240*a* . . . 240*n* (collectively, 240). In addition to receiving the N individual pump signals, for a co-pumping scheme, the pump-signal combiners 240 concurrently receive the optical signals (from their respective signal inputs 205). Thus, for each parallel path, the pump and signal are combined at the pump-signal combiner 240 before the combined pump-and-signal is provided to its corresponding gain fiber 245. Similar to the input, each gain fiber 245 can also have an optional output monitor 250*a* . . . 250*n* (collectively, 250) to monitor the amplified signal from the gain fiber 245. The pump-signal combiner 240 may be a tapered fiber bundle (TFB). Alternatively, the pump and signal may be coupled using side-coupling. In alternative embodiments, a counter-pumping scheme can be used, as understood by those having skill in the art.

The system 200 further comprises optical signal outputs 260*a* . . . 260*n* (collectively, 260) that outputs the amplified signals in parallel. It should be appreciated that output isolators 255*a* . . . 255*n* (collectively, 255) can optionally be interposed between the gain fibers 245 and the signal outputs 260. Insofar as the system 200 operates in the O-Band, the signal outputs 260 have XO centered between ~1260 nm and ~1360 nm.

The parallel (or arrayed) O-Band system 200 can be constructed in distributed modules that can be integrated with elements of an optical switch (e.g., optical switches with N parallel ~400 Gb/s input and/or output ports, etc.), an optical router (e.g., optical routers with ~400 Gb/s parallel input and/or output ports), or any other type of optical transceiver. For embodiments that integrate parallel O-Band amplification in an optical switch, the parallel O-Band amplifier 200 may boost power at the output of the switch, or at the input of the switch, or both.

Preferably, for some embodiments, the parallel O-Band optical amplifier system 200 produces a receiver input gain (G) of more than approximately three decibel (i.e., G>~3 dB) and produces a power conversion efficiency (PCE) that is greater than approximately five percent (i.e., PCE>~5%). As such, the system 200 simultaneously amplifies a number of optical lanes carried out over separate fibers, separate fiber cores (e.g., in multi-core fibers), or a combination of both (e.g., multiple multi-core fibers), with each lane potentially carrying a number of WDM channels (as CWDM or LAN-WDM).

Those having skill in the art will appreciate that, to be effective (and considering a typical power budget), the disclosed parallel O-Band amplifier system 200 only needs to provide a few dB of gain and only a few dBm of output power per optical lane. For example, a 4 dB gain may be sufficient to increase link length (or transmission distance) by ~10 km, where typical receiver sensitivity for 50 Gbaud/s PAM-4 is approximately −4 dBm to ~0 dBm. As another example, for a 10% PCE and required output power of +0 dB/lane, the disclosed embodiment would require pump power of only ~10 mW/lane. Comparatively, conventional typical single-mode (SM) laser diodes have a ~500 mW output power, while conventional multi-mode (MM) laser diodes have ~10 W output power (an enormous difference in comparison to the requirements of the disclosed parallel O-Band amplifier system 200).

In terms of overall power consumption, amplification of low-power signals is sometimes more efficient than increasing the power of continuous-wave (CW) lasers, even with limiting PCE. For example, if the power budget of 32 fiber channels with a total CW source power of 26 dBm (400 mW) is improved by 6 dB, then the receiver input power correspondingly increases from −6 dBm to +0 dBm per fiber channel. In other words, the power in each fiber channel after the transmission is 32 dB lower than the total CW source power. Traditionally, the 6 dB increase in CW source power would require a 1.2 Watts (W) increase in optical power and a 4.8 W increase in electrical power (presuming a twenty-five percent (25%) wall-plug efficiency for cooled high-power lasers). Comparatively, presuming the disclosed parallel O-Band amplifier system 200 has an efficiency of 20% PCE, the parallel O-Band amplifier system 200 would only require 160 mW of pump optical power for corresponding improvements. Furthermore, because uncooled pump lasers are often used for O-Band communication, the parallel O-Band amplifier system 200 exhibits a higher wall-plug efficiency (of ~50%) for 320 mW of electrical power. Even with a ~5% PCE, the parallel O-Band amplifier system 200 results in 3.75× lower power consumption as compared to single-wavelength amplifier systems (e.g. semiconductor optical amplifiers or single wavelength fiber amplifiers).

At bottom, to reduce costs, complexity, and power consumption, the sharing of components (e.g., shared pumps) should be maximized while concurrently avoiding functionality doubling. Also, it would be beneficial to use ribbonized components and ribbon fibers to minimize the number of splices. It should also be noted that the lanes may refer to any waveguide structure, such as multiple optical fibers, multiple cores within a single fiber (e.g., a multi-core fiber), or multiple multi-core fibers.

Next, higher capacity is often realized by increasing channel bit-rate and WDM channel count. In other words, link capacity is typically increased by raising fiber channel capacity or increasing the number of fiber channels. However, increasing link capacity by raising the fiber channel capacity will result in power budget restrictions. Therefore, in the parallel O-Band amplifier system 200, providing simultaneous gain to multiple fiber channels provides a more efficient solution than what has been implemented in conventional amplifier systems.

For embodiments having multi-mode (MM) pumps and single-mode (SM) gain fibers, a corresponding number of MM-to-SM conversion is required. One approach is to use a photonic lantern 300, which is shown in FIGS. 3A and 3B. Specifically, FIG. 3A shows a transverse view of the photonic lantern 300 that converts MM signals to SM signals, while FIG. 3B shows an axial view of the photonic lantern 300 (at a splice point between the MM side and the SM side). The MM fiber 310 comprises a MM core 320. The MM side is spliced (at a point designated by the line A-A) to a SM side 340. The SM side 340 comprises multiple tapered SM cores 330a . . . 330n (collectively, 330), thereby allowing for conversion of MM signals to SM signals.

Because output power of a photonic lantern 300 is often unequal, power equalization may be necessary. One approach is to use a power equalizer 400, such as a fused coupler, which is shown in FIG. 4. As shown in FIG. 4, the power equalizer 400 comprises a multimode pump 410 with an optical connection 415 to a MM-to-SM coupler 420 (such as that shown in FIGS. 3A and 3B). The one (1) input 415 from the MM pump 410 is converted to N coupler outputs 425. The N coupler outputs 425 is input to an N-input-N-output SM coupler 430, which produces N equalized SM signals 435. Those having skill in the art will appreciate that other approaches to signal equalization and MM-to-SM conversion may be employed.

The disclosed parallel O-Band system 200 can be implemented in a variety of telecommunications, data communications systems, or non-data transmission environments. Examples of such implementations are shown in FIGS. 5 and 6. Specifically, FIG. 5 shows a block diagram of an optical transmission system for communicating from one data center 510 to another data center 530 through long-haul transmission fibers 520a . . . 520n (collectively, 520). As shown in FIG. 5, the transmission fibers 520 are optically coupled to parallel O-Band amplifier systems 200a, 200b at both the transmission end and the reception end. With this configuration, the parallel O-Band amplifier systems 200a, 200b can be used in systems that require fiber optic transmission lengths that exceed ~20 km (and, preferably, exceeding ~40 km).

Because large capacity information is transmitted from one data center 510 to another data center 530, a large fiber count (e.g., N≥96) is required for the transmission fibers 520. Thus, when capacity upgrades are implemented (e.g., number of channels increases, data rate increases, etc.), it becomes more convenient and cost effective to upgrade silicon photonics chips with appropriate parallel O-Band amplification (e.g., increasing pump power, etc.) than it would be to upgrade a large number of pluggable components. Furthermore, depending on wavelength, modulation format, and baud rate, the dispersion limit for O-Band is typically between ~40 km and ~120 km and, thus, the power limit (or budget) in O-Band is reduced with the total link capacity. The parallel O-Band amplifier system 200 accommodates these extended distances in a cost-effective manner.

For example, a 400 Gb/s LR-8, 25 Gbaud/s PAM-4 LAN-WDM system is limited to ~10 km due to power. However, the corresponding dispersion limit is ~50 km. Because O-Band single-mode-fiber loss is ~4 dB/10 km, the long-haul transmission distance can be extended to ~20 km by simply increasing the gain by ~4 dB using the disclosed parallel O-Band amplifier system 200. Similarly, the transmission distance can be extended to ~30 km and even up to ~40 km by increasing the gains to ~8 dB and ~12 dB, respectively. It is worthwhile to note that these gain values (e.g., ~4 dB, ~8 dB, or ~12 dB) are much lower than conventional C-Band terrestrial or metro links. Nevertheless, even with such low gain values, the O-Band transmission can be increased approximately four-fold (~4×).

One noteworthy point is that, in FIG. 5, the parallel O-Band amplifier system 200 is placed at a point where power is low, thereby reducing power consumption. This placement of the parallel O-Band amplifier system 200 proceeds contrary to conventionally accepted wisdom because telecommunications systems are typically limited by noise and, therefore, require sufficient signal power to avoid signal-to-noise (SNR) degradation.

Before continuing, it should be appreciated that the inter-datacenter architecture of FIG. 5 can be implemented in an intra-datacenter architecture that has high data capacity requirements. Insofar as the system components are substantially similar between inter-datacenter and intra-datacenter architectures, further discussions of high-capacity intra-datacenter systems is omitted herein.

Turning to FIG. 6, a star-type network with a central node 610 and peripheral nodes 630a . . . 630n (collectively, 630) are shown. Unlike FIG. 5, where all of the N transmission lines 520 connect between only two (2) entities (i.e., one data center 510 and another data center 530), the embodiment of FIG. 6 comprises transmission lines 620a ... 620n (collectively, 620) that are connected from the central node 610 to multiple different peripheral nodes 630. In other words, the parallel O-Band amplifier system 200 is used for long-haul transmission to multiple different entities. It should be noted that having multiple peripheral nodes 630 does not preclude placing parallel O-Band amplifier systems 200 in remote nodes.

The parallel O-Band amplifier system 200 of FIG. 2 can also be configured as a part of an optical sub-system, similar to the optical switch or optical router (discussed above). These types of optical switches or routers have large numbers (e.g., N=128) of high-capacity input ports (e.g., ~400 Gb/s input) and large numbers (e.g., N=128) of high-capacity output ports (e.g., ~400 Gb/s output), with each port carrying multiple WDM channels (e.g., 4 to 8 channels) at very high data rates (e.g., greater than ~100 Gb/s).

Thus, one approach is to use relatively small numbers of high-power lasers that are divided between a number of data modulators in silicon photonics chips, with the high-power lasers being located remotely (at some distance away) from silicon photonics chips. Because of the limit on output power of the laser diodes, and because the combined loss of silicon photonics chips with the fiber link can exceed ~30 dB, additional per-fiber parallel optical amplification can be provided with the parallel O-Band amplifier system 200.

It should be appreciated that the pump lasers can be located remotely (up to several hundreds of meters from the silicon photonics chip), thereby reducing heat distribution problems. The gain fibers and other components can be located around the physical perimeter of the switch or router, rather than at the center of the switch or router.

For some embodiments, the pump-signal combiners can be placed on the silicon photonics chip, thereby allowing for the pump lasers to be remotely located but dividing the pump signals at the silicon photonics chip itself so that the proximity of the pump and signal are close to the transmission or receiver lanes (or both lanes). This configuration allows for the gain fibers to be coupled to the inputs or outputs of the silicon photonics chip.

As shown in the embodiments of FIGS. 2 through 6, the sharing of resources (such as, for example, pump sources) to provide parallel amplification in the O-Band reduces both the cost and the power consumption. Consequently, a previously impractical approach (namely, high data capacity and long-distance O-Band communication) becomes commercially viable by using the disclosed parallel O-Band amplifier system 200.

Any process descriptions or blocks in flow charts should be understood as being executable out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made.

For example, individual or shared medium pump-signal combiners may be used. Also, pump and signal may be combined using fused components (for individual or integrated solutions (meaning, a number of components are packaged together)). Further, the center wavelength of fused WDM may be selected to provide gain equalization. For some embodiments, passive filters can be used for pump-signal combining. For example, a shared medium (e.g., thin-film filter) may be used to combine simultaneously multiple pump-signal pairs. In some embodiments, the pump-signal combiners may include other components, such as, for example, integrated isolators, taps, etc. For a counter-pumping scheme, the pump and signal can be combined through an optical circulator. It should be appreciated that the pump-signal combiner can also be a ribbonized component. For embodiments in which the gain fibers exhibit bleaching effects (PCE dependence of input signal power), both the transmitter end and the receiver end may be amplified.

All such changes, modifications, and alterations should therefore be seen as within the scope of the disclosure.

What is claimed is:

1. A system comprising:
    optical signal inputs for inputting optical signals;
    an optical switch for switching the optical signals, the optical switch comprising:
        input ports, each input port having an input data rate of approximately four hundred gigabits per second (~400 Gb/s); and
        output ports, each output port having an output data rate of ~400 Gb/s;
    N gain fibers, N being an integer that is greater than or equal to two (2≤N), the gain fibers being optically coupled to corresponding optical signal inputs, each gain fiber for receiving an optical signal from a corresponding optical signal input;
    P pump sources, P being an integer that is less than or equal to N (P≤N), each pump source being optically coupled to a corresponding subset of gain fibers, the pump sources for providing shared pump signals to the gain fibers;
    optical signal outputs, the optical signal outputs being optically coupled to corresponding gain fibers; and
    an operating center wavelength (λ0) of the optical signal outputs, λ0 being centered between approximately 1260 nanometers (~1260 nm) and ~1360 nm for the system to operate in the original band (O-Band).

2. The system of claim 1, wherein the system is a parallel band O-Band optical amplifier comprising:
    a receiver input gain (G) of more than approximately three decibels (G>~3 dB); and
    a power conversion efficiency (PCE) of more than approximately five percent (PCE>~5%).

3. The system of claim 1, further comprising a pump unit comprising:
    a pump distributor comprising the P pump sources;
    driving circuits for outputting the P pump signals; and
    a pump equalizer for substantially equalizing the P pump signals.

4. The system of claim 3, the pump unit further comprising a ribbonized output.

5. The system of claim 1, further comprising a pump distributor, the pump distributor for splitting the shared pump signals from the P pump sources to N individual pump signals.

6. The system of claim 5, further comprising N pump-signal combiners for receiving corresponding pump signals, the pump-signal combiners further for receiving corresponding optical signals, the pump-signal combiners further for combining the received pump signals with the received optical signals.

7. The system of claim 1, the gain fibers being ribbonized.

8. The system of claim 1, further comprising:
    N input optical isolators optically coupled between corresponding optical signal inputs and corresponding gain fibers; and N output optical isolators optically coupled between corresponding gain fibers and corresponding optical signal outputs.

9. The system of claim 1, further comprising:
transmission optical fibers, each transmission optical fiber being optically coupled to a corresponding optical signal output; and
a transmission length for each optical fiber being greater than approximately twenty kilometers (~20 km).

10. The system of claim 1, wherein the system is one selected from the group consisting of:
a semiconductor optical chip;
a datalink between datacenters; and
a datalink between a central network node and a peripheral node.

11. A system comprising:
optical signal inputs;
N gain fibers, N being an integer that is greater than or equal to two (2≤N), the gain fibers being optically coupled to corresponding optical signal inputs, each gain fiber for receiving an optical signal from a corresponding optical signal input;
P pump sources, P being an integer that is less than or equal to N (P≤N), N being greater than or equal to 16P (N≥16P), each pump source being optically coupled to a corresponding subset of gain fibers, the pump sources for providing shared pump signals to the gain fibers;
optical signal outputs, the optical signal outputs being optically coupled to corresponding gain fibers; and
an operating center wavelength ($\lambda 0$) of the optical signal outputs, $\lambda 0$ being centered between approximately 1260 nanometers (~1260 nm) and ~1360 nm for the system to operate in the original band (O-Band).

12. The system of claim 11, wherein:
N is greater than or equal to thirty-two (N≥32); and
P is less than or equal to two (P≤2).

13. The system of claim 11, wherein:
N is greater than or equal to ninety-six (N≥96); and
P is less than or equal to six (P≤6).

14. The system of claim 11, wherein:
N is greater than or equal to one-hundred and twenty-eight (N≥128); and
P is less than or equal to two (P≤2).

15. A system comprising:
optical signal inputs;
N gain fibers, N being an integer that is greater than or equal to two (2≤N), the gain fibers being optically coupled to corresponding optical signal inputs, each gain fiber for receiving an optical signal from a corresponding optical signal input, the gain fibers being multi-core fibers, the multi-core fibers being configured for core-pumping or cladding pumping;
P pump sources, P being an integer that is less than or equal to N (P≤N), each pump source being optically coupled to a corresponding subset of gain fibers, the pump sources for providing shared pump signals to the gain fibers;
optical signal outputs, the optical signal outputs being optically coupled to corresponding gain fibers; and
an operating center wavelength ($\lambda 0$) of the optical signal outputs, $\lambda 0$ being centered between approximately 1260 nanometers (~1260 nm) and ~1360 nm for the system to operate in the original band (O-Band).

* * * * *